(12) United States Patent
Gomariz (10) Patent No.: US 12,129,625 B1
(45) Date of Patent: Oct. 29, 2024

(54) UTILITY TRUCK BODY WITH INTEGRATED MULTIFUNCTIONAL HYDRAULIC ARM AND LIFT ASSEMBLY

(71) Applicant: Nexpro Trucks & Equipment Corp, Miami Lakes, FL (US)

(72) Inventor: Jorge Gomariz, Coral Gables, FL (US)

( * ) Notice: Subject to any disclaimer, the term of this patent is extended or adjusted under 35 U.S.C. 154(b) by 853 days.

(21) Appl. No.: 17/245,931

(22) Filed: Apr. 30, 2021

(51) Int. Cl.
| | |
|---|---|
| *E02F 3/65* | (2006.01) |
| *B60P 3/28* | (2006.01) |
| *E02F 3/36* | (2006.01) |
| *F02B 63/02* | (2006.01) |

(52) U.S. Cl.
CPC ............... *E02F 3/651* (2013.01); *B60P 3/28* (2013.01); *E02F 3/3663* (2013.01); *F02B 63/02* (2013.01)

(58) Field of Classification Search
CPC . E02F 3/651; E02F 3/3663; B60P 3/28; B60P 1/48; B60P 1/483; F02B 63/02
USPC ................ 414/668, 671, 496, 541, 542, 544
See application file for complete search history.

(56) References Cited

U.S. PATENT DOCUMENTS

| | | | | |
|---|---|---|---|---|
| 3,263,628 A * | 8/1966 | Grove | ..................... | B60F 1/043 |
| | | | | 280/30 |
| 4,790,710 A * | 12/1988 | Ayalon | ..................... | B60P 3/28 |
| | | | | 414/718 |
| 9,121,340 B2 | 9/2015 | Beckman et al. | | |
| 9,353,769 B2 * | 5/2016 | Peters | ..................... | B23K 9/164 |
| 9,434,582 B2 * | 9/2016 | Arthur | ..................... | B66C 23/18 |
| 11,752,051 B2 * | 9/2023 | Toolan | ..................... | B60P 1/4421 |
| | | | | 414/544 |
| 2010/0054899 A1 * | 3/2010 | Hacker | ................. | B60P 1/6463 |
| | | | | 414/470 |
| 2010/0215468 A1 * | 8/2010 | Kollewe | ............... | B60P 1/4421 |
| | | | | 414/544 |
| 2021/0061155 A1 * | 3/2021 | Dyck | ........................ | B60P 1/48 |
| 2022/0103122 A1 * | 3/2022 | Carter | .................... | B25J 9/0084 |

* cited by examiner

*Primary Examiner* — Glenn F Myers
(74) *Attorney, Agent, or Firm* — Sanchelima & Associates, P.A.; Jesus Sanchelima; Christian Sanchelima (57) ABSTRACT

A hydraulic system for a service vehicle wherein a hydraulic pump is powered by the vehicle engine to energize a hydraulic circuit that can power multiple interchangeable implements and hand tools. The multiple interchangeable implements include a lift assembly mounted to the flatbed of the truck. The lift assembly includes a mini skid steer which is hydraulically lifted on and off the platform of the flatbed. Additionally, the interchangeable implements include a crane arm that is disposed on the flatbed of the truck. Furthermore, the interchangeable implements also include a hydraulic arm assembly with several hydraulic attachments. These attachments may include a bucket, a drill, a breaker and the like.

15 Claims, 10 Drawing Sheets

UTILITY TRUCK BODY WITH INTEGRATED MULTIFUNCTIONAL HYDRAULIC ARM AND LIFT ASSEMBLY

BACKGROUND OF THE INVENTION

1. Field of the Invention

The present invention relates to a utility truck body system and, more particularly, to a utility truck with engine powered hydraulic system that powers a lift containing a mini skid steer, a crane, and an interchangeable arm assembly as well as an assortment of hydraulic hand tools.

2. Description of the Related Art

Several designs for utility truck system have been designed in the past. None of them, however, include a hydraulic circuit system for a service vehicle wherein a hydraulic pump is powered by the vehicle's engine to energize a hydraulic circuit that can power multiple hydraulic implements, interchangeable attachments, and hydraulic handheld tools. The multiple implements include a lift assembly mounted on the flatbed of the truck. The lift assembly is of a proprietary design and was engineered to lift and lower a mini skid steer on and off the truck's flatbed. Additionally, the hydraulic implements include a hydraulic crane that is disposed on the flatbed of the truck. Furthermore, the hydraulic implements also include a hydraulic arm assembly with several interchangeable attachments. These attachments may include a bucket, a plate compactor, a breaker, an auger drill, and the like. It is known that utility workers often have the need for a utility truck with an assortment of tools depending on the application. Therefore, there is a need for a versatile utility truck with a powerful and efficient hydraulic system that powers a lift assembly, a crane assembly, and an arm assembly with interchangeable attachments.

Applicant believes that a related reference corresponds to U.S. Pat. No. 9,353,769 issued for a service vehicle with an engine powered hydraulic pump which can power multiple devices and equipment. Applicant believes that another related reference corresponds to U.S. Pat. No. 9,121,340 issued for a utility vehicle with an engine powered hydraulic pump. However, the cited references differ from the present invention because they fail to disclose a utility truck body with a multifunctional integrated hydraulic system that powers a lift containing a mini skid steer, a crane arm, and an arm assembly.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a utility truck body with an engine powered hydraulic system which provides a versatile truck with multiple tools available to a user.

It is another object of this invention to provide a utility truck with an engine powered hydraulic system with a multifunctional hydraulic arm to operate diverse attachment tool options.

It is another object of this invention to provide a utility truck with an engine powered hydraulic system with a lift assembly to accommodate a mini skid steer to aid a user with field work.

It is still another object of the present invention to provide a utility truck with an engine powered hydraulic system that powers multiple interchangeable hydraulic tools.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, where the present invention is generally referred to with numeral 10, it can be observed a vehicle system 10 which basically includes a truck assembly 20, a hydraulic arm assembly 40, a crane assembly 60, and a lift assembly 80.

Truck assembly 20 includes a truck engine 22 that is mounted onto a truck flatbed 24 as observed in FIGS. 1-4 of the provided drawings. In one embodiment, truck engine 22 is provided at a front end of a truck under the hood of the driver cabin. The truck cabin me be provided as a two-door cabin or a four-door cabin as is common with trucks. Truck engine 22 is provided as having an integrated motor with a PTO (power take-off) and a hydraulic pump. The hydraulic pump is then used to energize a hydraulic system that will power various hydraulic tools that are associated with vehicle system 10. Truck flatbed 24 is positioned on a rear operational side of truck engine 22. In one implementation, truck flatbed 24 is a rectangular structural base member that is operative engaged to the truck engine. Truck flatbed 24 includes wheels such that is moves with truck engine 22 when a user is driving the vehicle system 10. It should be understood that truck flatbed 24 may be provided as having any suitable length for operation with truck engine 22.

Figure 1:
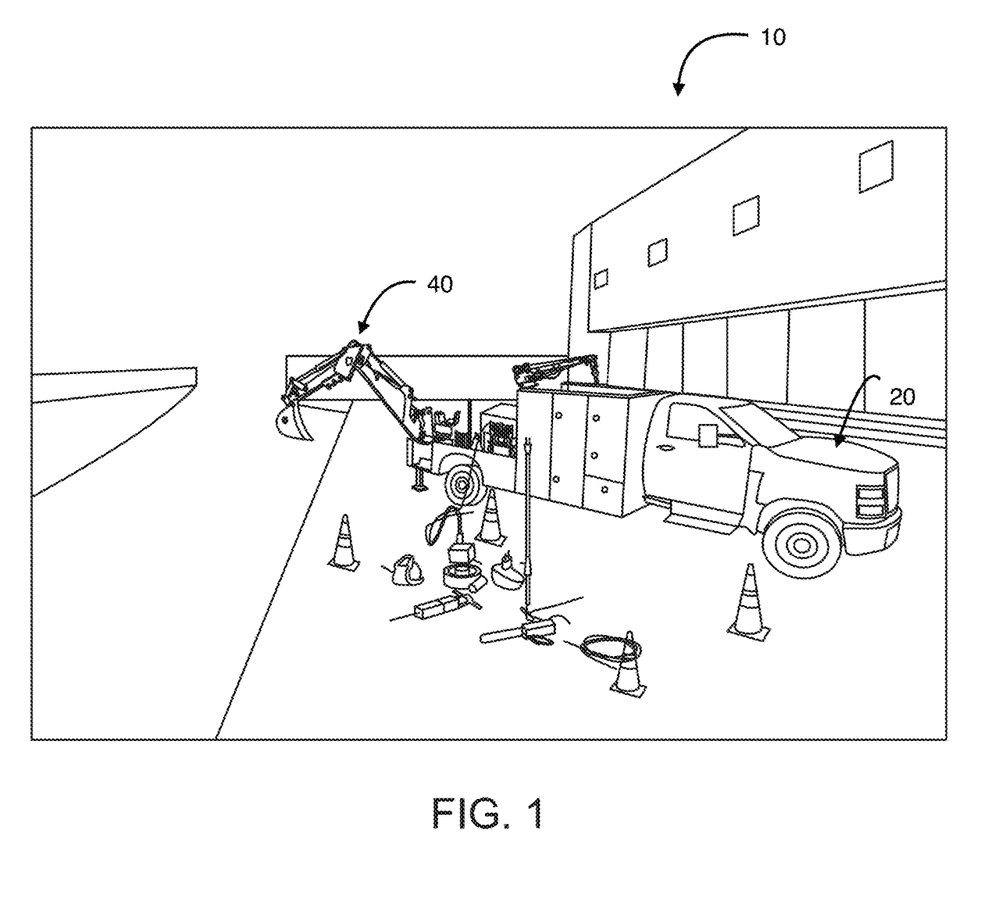
FIG. 1 represents an operational isometric view of vehicle system 10 in accordance with an embodiment of the present invention.
Figure 2:
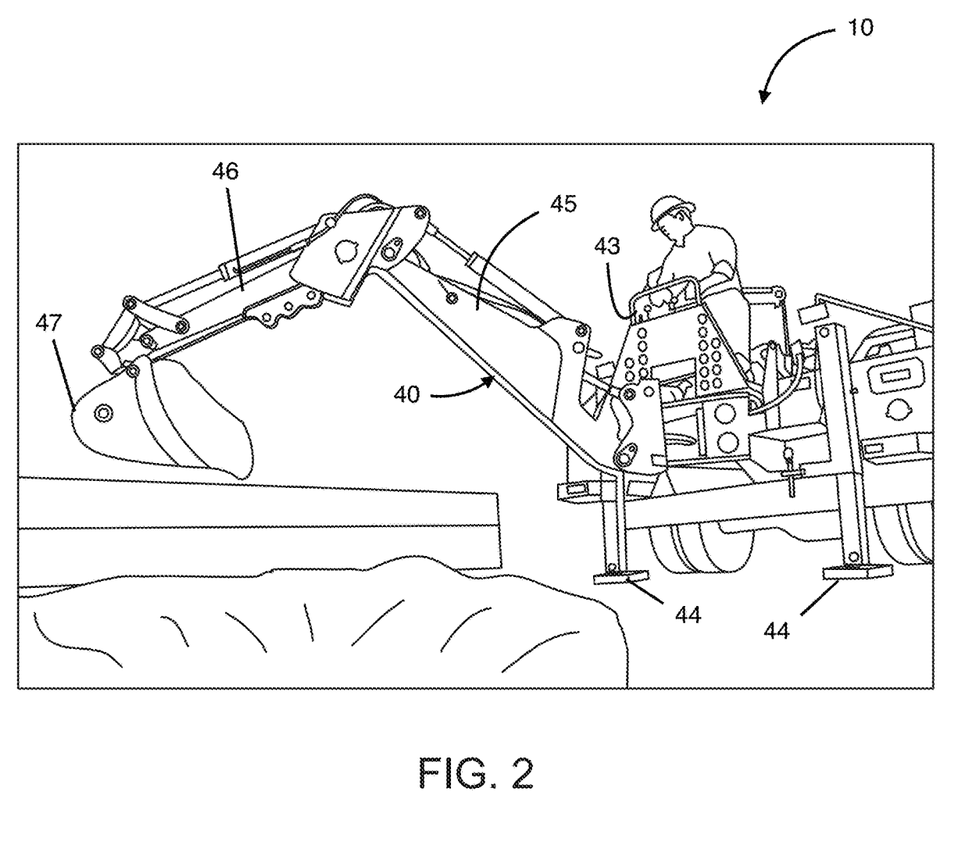
FIG. 2 shows another operational isometric view of vehicle system 10 depicting hydraulic arm assembly 40 in an operational setting in accordance with an embodiment of the present invention.
Figure 3:
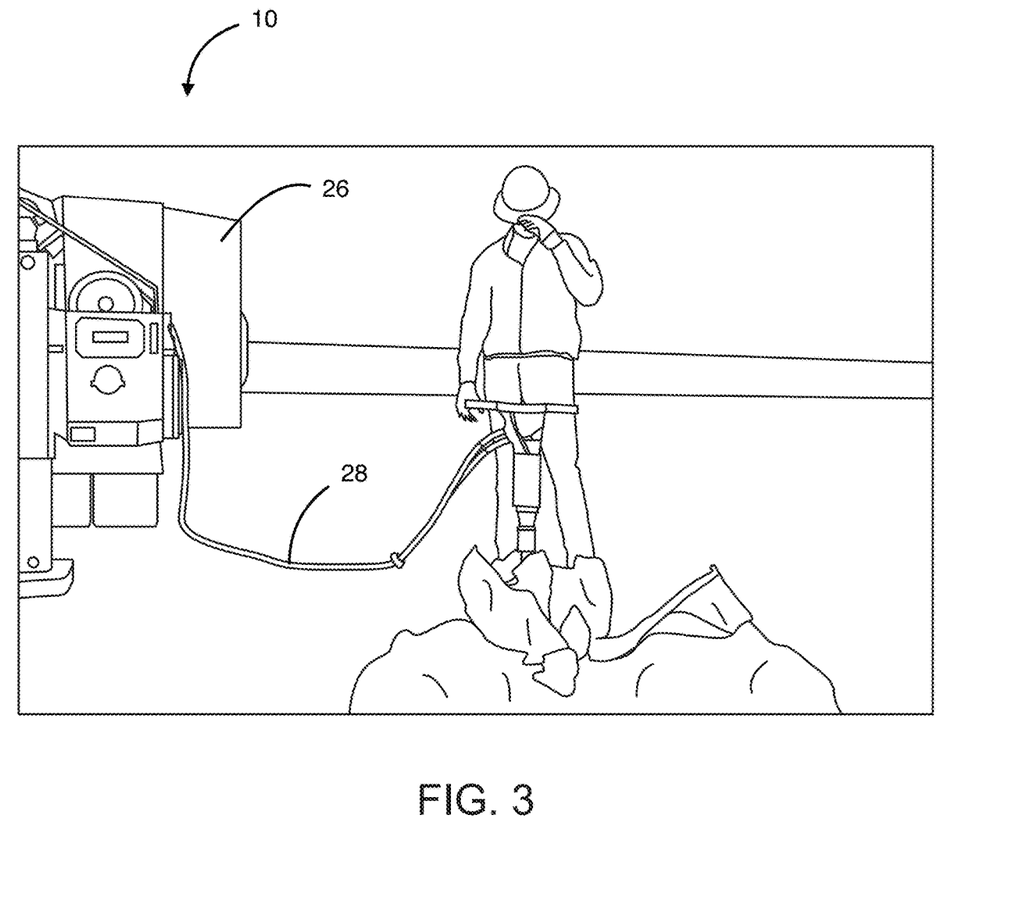
FIG. 3 illustrates another operational isometric view of vehicle system 10 depicting hydraulic system 28 in an operational setting in accordance with an embodiment of the present invention.
Figure 4:
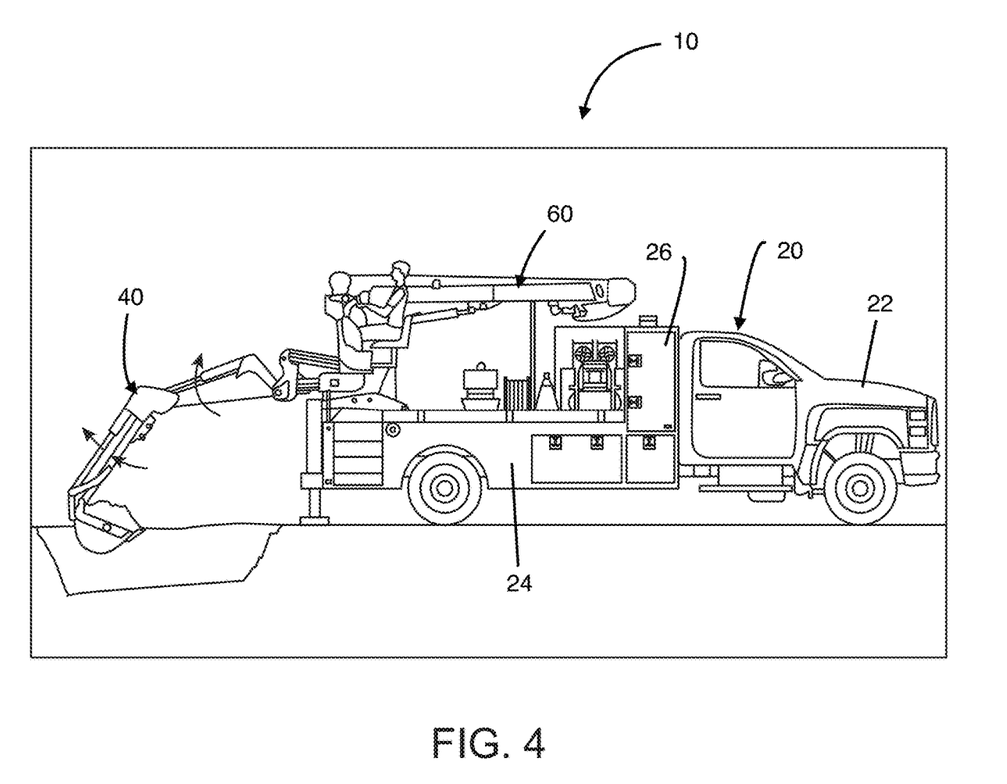
FIG. 4 is a representation of a side view of vehicle system 10 depicting truck assembly 20 and hydraulic arm assembly 40 in an operational environment in accordance with an embodiment of the present invention.
Figure 5:
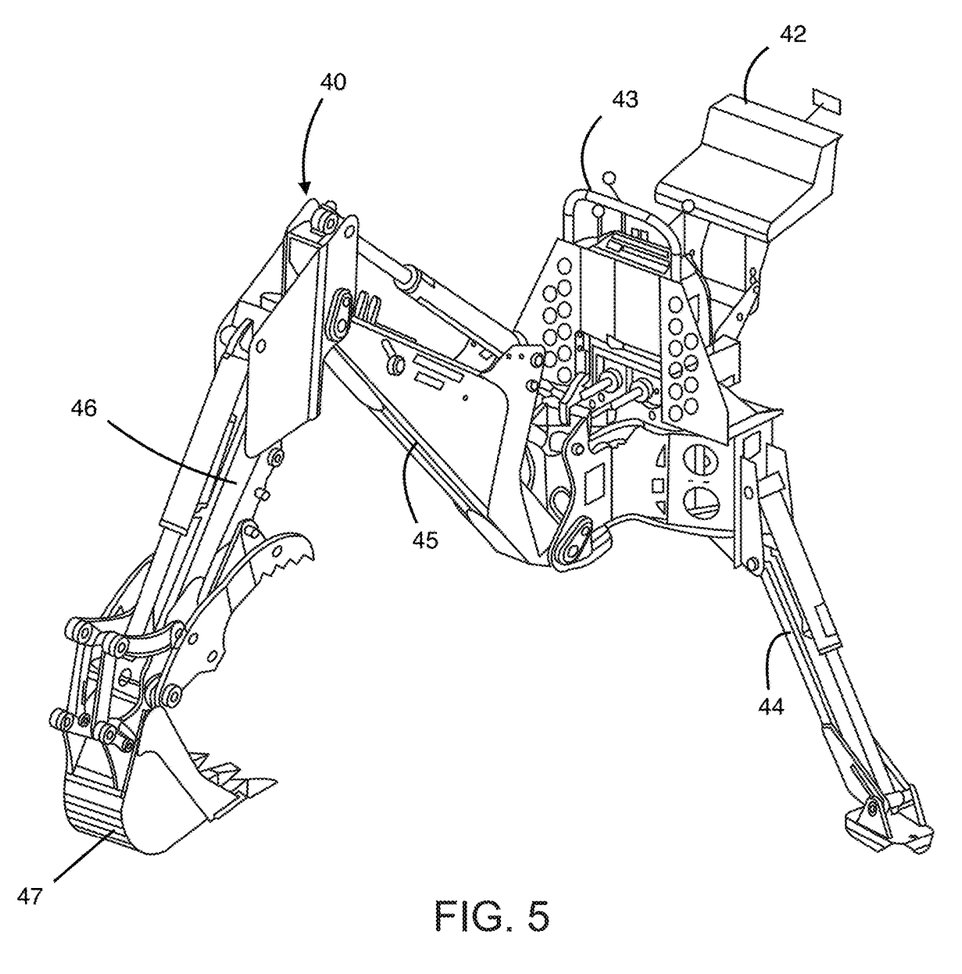
FIG. 5 shows an isometric view of hydraulic arm assembly 20 in accordance with an embodiment of the present invention.

Truck assembly 20 further includes cabinets 26 and a hydraulic system 28 as also depicted in FIGS. 1-4 of the provided drawings. It can be observed that cabinets 26 are positioned towards a rear end of truck flatbed 24. In one embodiment, cabinets 26 form an L-shape configuration and is abutting with the rear end of the truck cabin as observed in FIG. 8. Having cabinets 26 positioned in this configuration allow for the amplest space on truck flatbed 24 to make room for the other assemblies. Cabinets 26 can be used to store various tools and materials that are associated with a service vehicle. It should be understood that other embodiments of the invention may feature additional cabinets 26 or have them positioned in different configurations. FIG. 3 observes an embodiment of hydraulic system 28 in use. In the present implementation, hydraulic system is coupled to truck engine 22 to provide hydraulic power to a power tool as seen in the figure. In the present embodiment, the hydraulic tool is an interchangeable implement or handheld tool and is not limited to being a jack hammer as seen in FIG. 3. Other implements and handheld tools may be engaged with hydraulic system 28 for operational tools. These implements include but are not limited to saw motors for cutting through concrete, circular saws, impact hammers, jack hammers, bilge pumps, bench grinders, and other hydraulic implements. In other embodiments of the present invention, truck assembly 20 may further by fitted with gas compressors, air compressors, and tanks for storing water or fuel, and generator units.

hydraulic arm assembly 40 is operatively mounted onto truck assembly 20 as observed in FIG. 2. An enlarged view of hydraulic arm assembly 40 may be observed in FIG. 5 of the provided drawings. In one embodiment hydraulic arm assembly 40 includes a seat 42 that is an integral part of the hydraulic arm assembly 40. Seat 42 may be provided as any seat structure that allows for comfortable sitting posture for a user when operating hydraulic arm assembly 40. Furthermore, hydraulic arm assembly 40 includes controls 43 that are positioned in front of seat 42. In the present implementation, controls 43 allow a user to operate hydraulic arm assembly 40. In one embodiment, hydraulic arm assembly 40 is powered by either truck engine 22 or an external power source. Hydraulic arm assembly 40 further includes retractable support outriggers 44. Retractable support outriggers 44 may be provided as telescopic hydraulic support structures which engage a ground surface in order to provide the stabilizing support needed for operation of hydraulic arm assembly 40. In one embodiment, retractable support outriggers 44 are coupled to directly to the body of hydraulic arm assembly 40 and extend outwardly therefrom. In another embodiment, observed in FIGS. 2 and 4, retractable support outriggers 44 are coupled directly to truck flatbed 24 and extend outwardly therefrom. In this embodiment, retractable support outriggers 44 extend downwardly from a bottom end of truck flatbed 24 and engages with the ground surface. It should be understood supplemental retractable support outriggers 44 may be positioned along truck flatbed 24 for additional stabilization to be used when needed.

Hydraulic arm assembly further comprises a first portion 45, a second portion 46, and an excavator head 47. In the present embodiment, first portion 45 is a first hydraulic structure which is in operative communication with controls 43. First portion 45 provides a first range of motion for the hydraulic assembly and is further operatively engaged with second portion 46. Second portion 46 is also a hydraulic structure in operative communication with controls 43. In one implementation, second portion 46 is hingedly engaged with first portion 45. Together, first portion 45 and second portion 46 form a two-segment hydraulic arm allowing for a wide range of motion. Excavator head 47 may be provided as an interchangeable implement, thereby allowing for multiple heads to be operatively coupled to second portion 46. In the present embodiment, excavator head 47 is also in operative communication with controls 43. Excavator head 47 may include interchangeable implements such as but no limited to a hydraulic compactor, a hydraulic breaker, a scooper, a bucket, an auger drill, and other structural implements. Furthermore, first portion 45 of hydraulic arm assembly 40 is coupled to truck flatbed 24 via a support mount 48. Support mount 48 may be provided as rectangular metal support bar that is positioned horizontally along a rear most end of truck flatbed 24 as observed in FIG. 7 of the provided drawings. In the present embodiment, hydraulic arm assembly 40 is coupled to truck assembly via support mount 48 via fasteners or welding.

Figure 6:
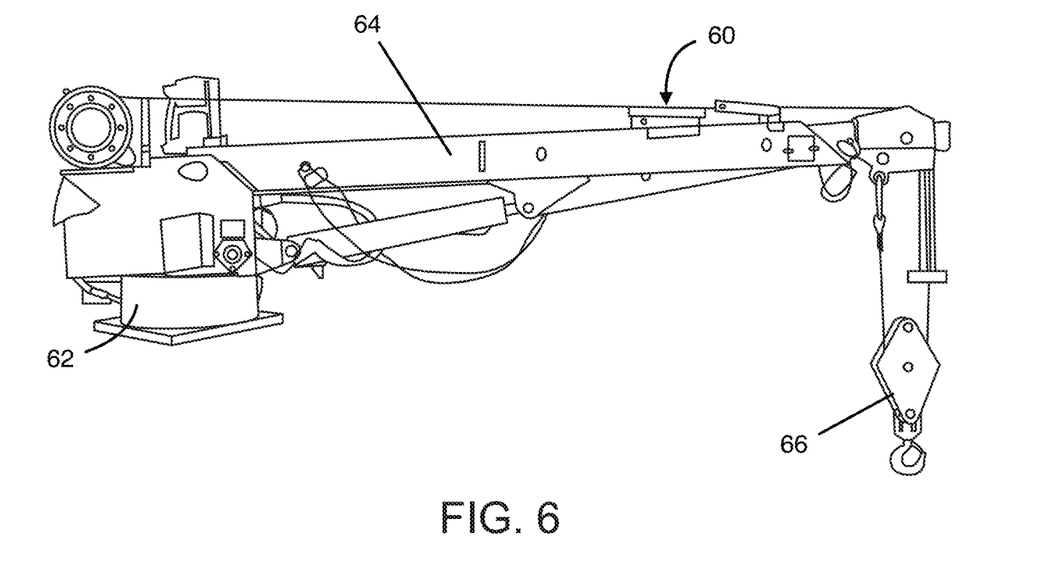
FIG. 6 illustrates an isometric view of crane assembly 60 in accordance with an embodiment of the present invention.

Crane assembly 60 may comprise of a crane mount 62, a crane arm 64, and a hook 66 as observed in FIG. 6 of the provided drawings. In on embodiment, crane mount 62 is provided as a substantially cylindrical base structure that is abutting with truck flatbed 24. Crane mount 62 is positioned along a proximal end of crane arm 64 and engaged thereon. In one implementation, crane arm 64 is provided as a hydraulically retractable crane arm having hook 66 located on a distal most end. Hook 66 is a metal hook member which is engaged to crane arm 64 via wiring as observed in FIG. 6. It should be understood that any variations of wiring may be used for crane assembly 60. In one embodiment, hook 66 is in operative communication with a winder for raising and lowering a load secured onto hook 66.

Figure 7:
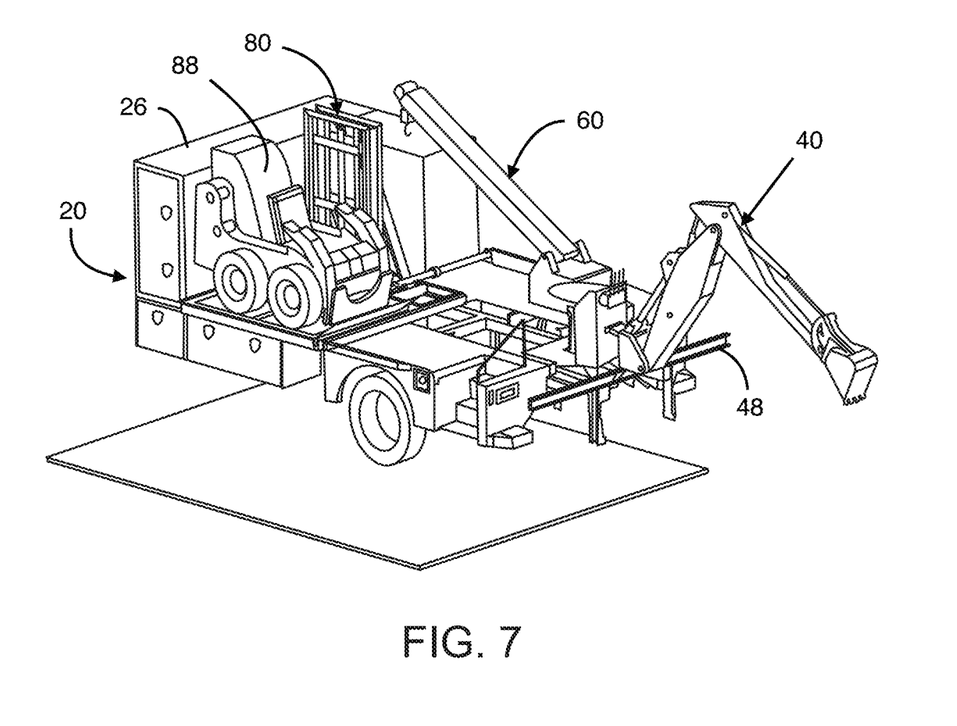
FIG. 7 represents an isometric operational view of lift assembly 80 mounted onto truck assembly 20 and engaged in a first position in accordance with an embodiment of the present invention.
Figure 8:
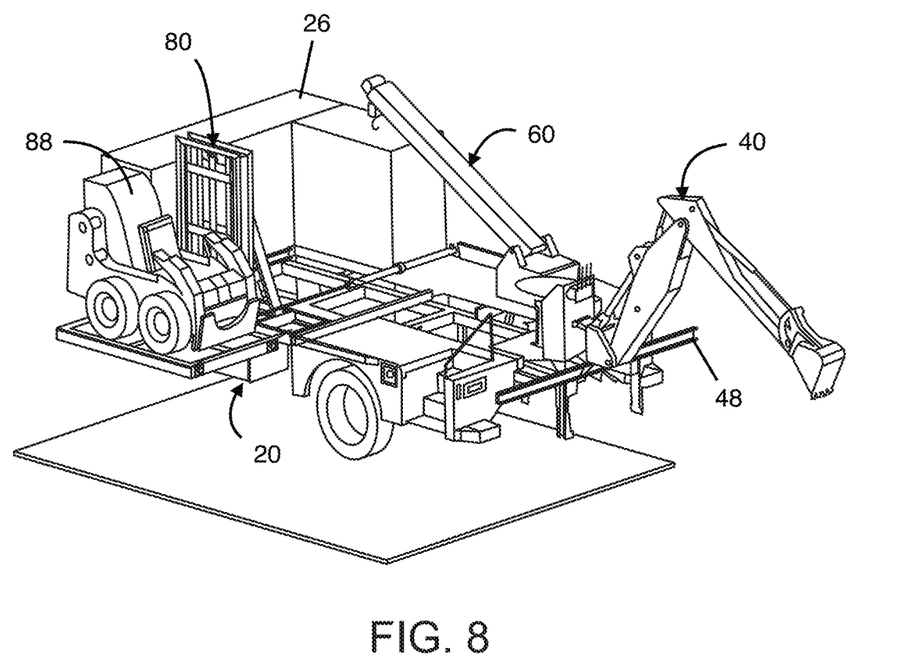
FIG. 8 shows another isometric operational view of lift assembly 80 mounted onto truck assembly 20 and engaged in a second position in accordance with an embodiment of the present invention.
Figure 9:
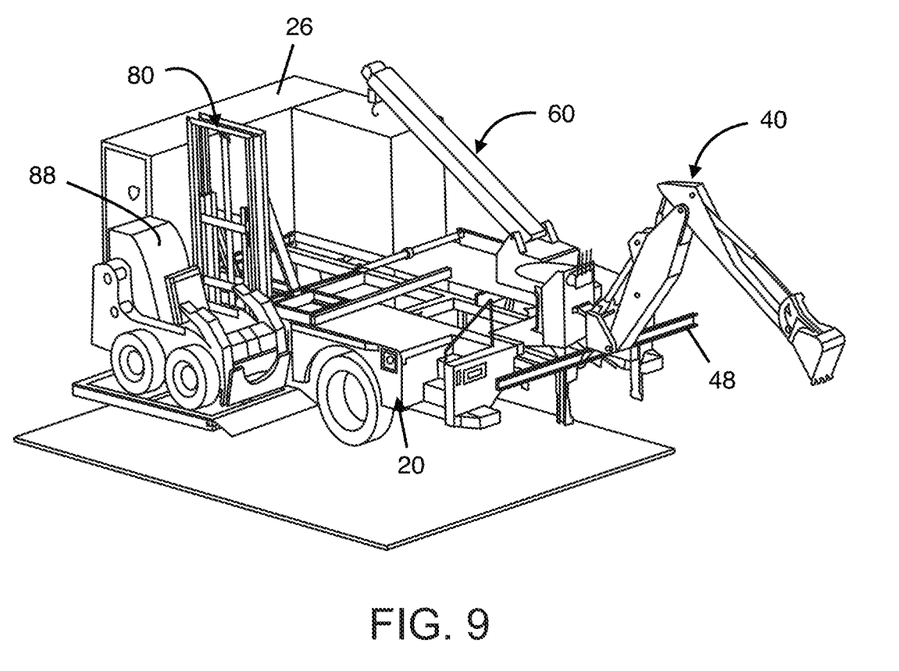
FIG. 9 illustrates yet another isometric operational view of lift assembly 80 mounted onto truck assembly 20 and engaged in a third position in accordance with an embodiment of the present invention.
Figure 10:
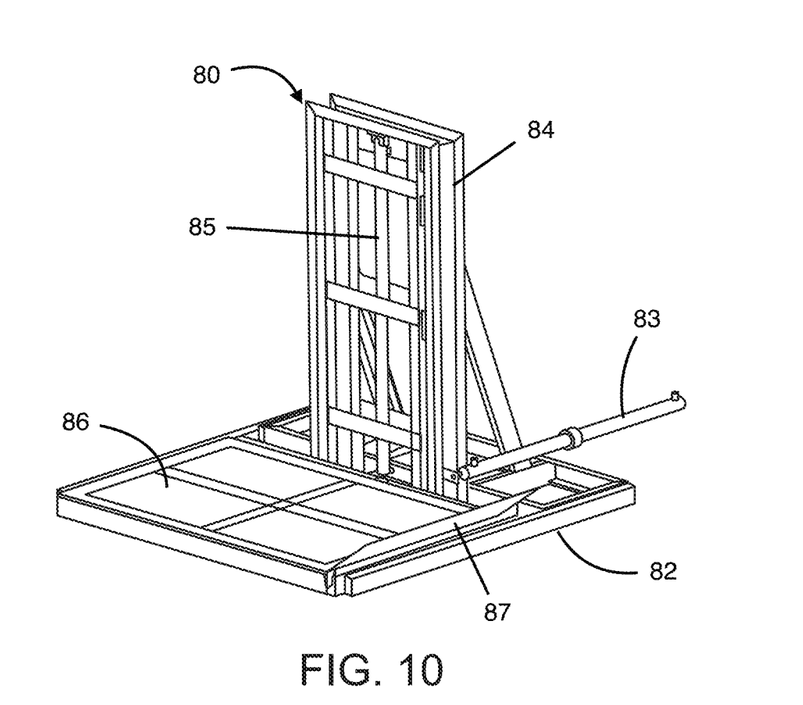
FIG. 10 is a representation of an enlarged isometric view of lift assembly 80 in a first position in accordance with an embodiment of the present invention.

Lift assembly 80 is operatively mounted onto truck flatbed 24 and may be observed in FIGS. 7-13 of the provided drawings. FIGS. 7-9 depict a first, second, and third position of the lift assembly 80. Lift assembly 80 comprises a first support frame 82 which is operatively engaged with a first hydraulic 83. In the present embodiment, first support frame is a horizontally positioned U-shaped support frame which is abuttingly engaged onto the top surface of truck flatbed 24. First hydraulic 83 is provided as a structural hydraulic member which is positioned partially along a top end of first support frame 82 as observed in FIG. 10. In a first position, observed FIG. 10, first hydraulic 83 is in a disengaged position and lift assembly 80 is located entirely along the top end of truck flatbed 24 as observed in FIG. 7. It should be understood that any variations of hydraulic 83 may be used to provide horizontal translation of first support frame 82. Lift assembly 80 further comprises a second support frame 84 and a second hydraulic 85. In the present embodiment, second support frame 84 a vertical rectangular frame structure that is positioned to be perpendicular to first support frame 82 as also observed in FIG. 10. Second hydraulic 85 is then vertically embedded within second support frame 84. In the first position observed in FIG. 10, first hydraulic 83 and second hydraulic 85 are in a disengaged configuration. In the present embodiment, platform 86 is a flat rectangular platform coupled to a bottom most end of second support frame 84. In the first position, platform 86 is located entirely on the top end of truck flatbed 24.

Figure 11:
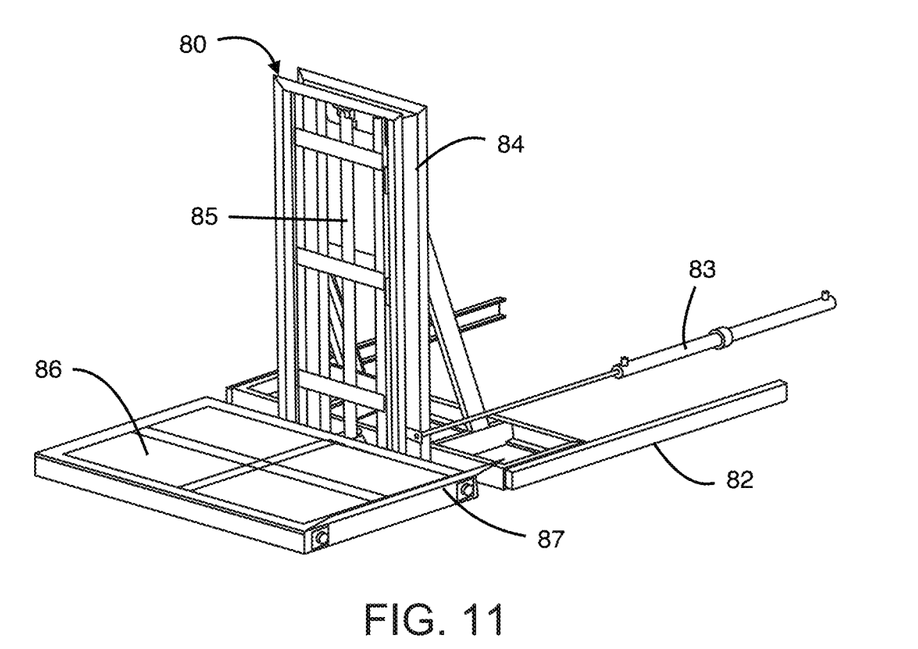
FIG. 11 shows another enlarged isometric view of lift assembly 80 in a second position in accordance with an embodiment of the present invention.

FIG. 11 depicts a second position for lift assembly 80. It can be observed that in the second position, first hydraulic 83 is in an engaged position and thereby results in the translation of second frame support 84 with platform 86. This second position may also be observed in FIG. 8. In the second position, first hydraulic 83 is engaged while second hydraulic 85 remains disengaged. As a result, platform 86 is translated to an extent such that it is no longer located on to the top end of truck flatbed 24.

Figure 12:
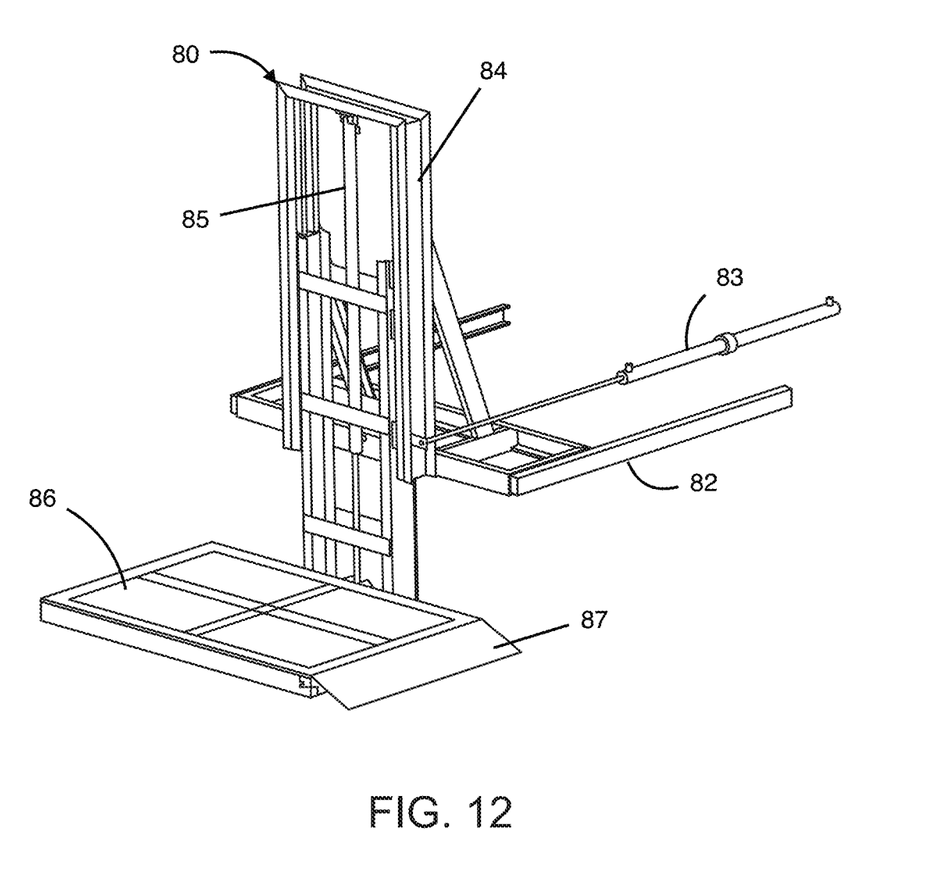
FIG. 12 illustrates yet another enlarged isometric view of lift assembly 80 in a third position in accordance with an embodiment of the present invention.
Figure 13:
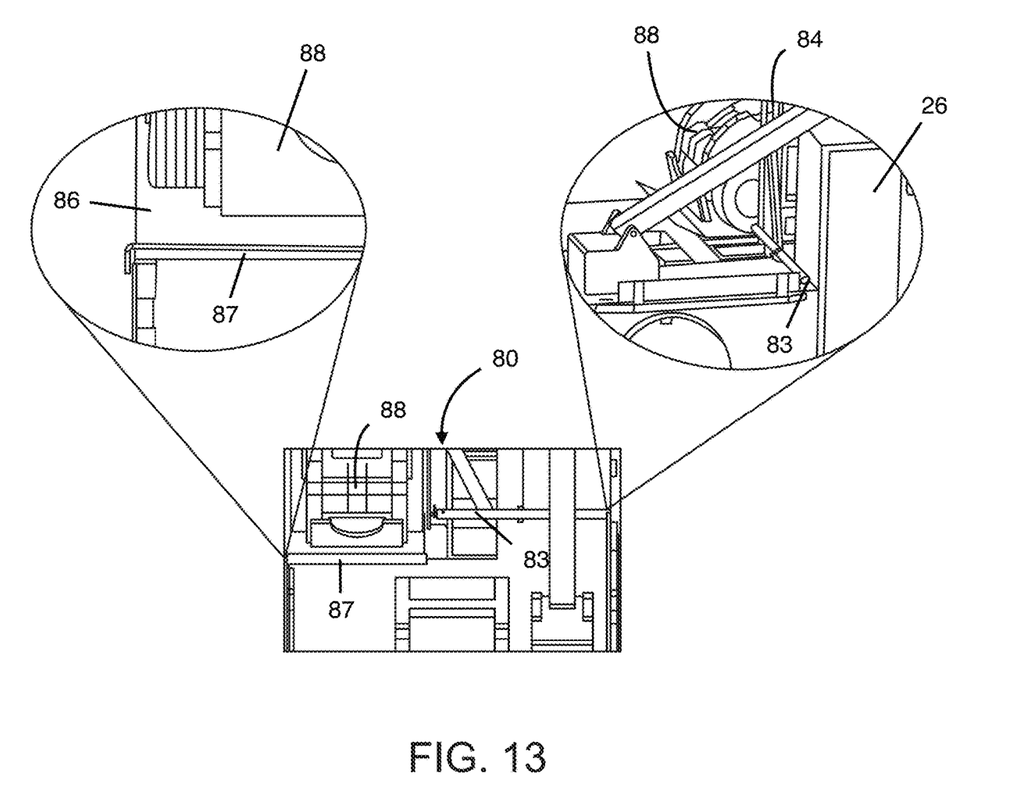
FIG. 13 represents an enlarged top view of lift assembly 80 being mounted onto truck assembly 20 in accordance with an embodiment of the present invention.

FIG. 12 depicts a third position for lift assembly 80. It can be observed that in the third position, both first hydraulic 83 and second hydraulic 85 are in and engaged position. This results in the downward translation of platform 86 until it is abutting with the ground surface as observed in FIG. 9 of the drawings. It should be understood that any variation of hydraulic 85 may be used to provide vertical translation to second frame support 84 with platform 86. As observed in the figures, lift assembly 80 includes a mini skid steer 88 which is positioned on top of the platform 86. Mini skid steer 88 is a manned mechanically vehicle that provides help for various servicing jobs. In various embodiments, mini skid steer 88 may be fitted with a fork, a mixer, a grapple, a saw, a breaker, and auger drill, and other equipment. The present embodiment also features a ramp 87 hingedly engaged to a peripheral edge of platform 86. Ramp 87 is an angled plane that provides a suitable mounting point for mini skid steer 88 when being dismounted and mounted onto platform 86.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A utility truck body system with an integrated multifunctional arm and a lift assembly for a service vehicle, comprising:
   a) a flatbed having a hydraulic circuit system capable of powering a plurality of interchangeable implements operatively coupled to the service vehicle; wherein said service vehicle is a truck having a truck engine and said flatbed is a truck flatbed; wherein said truck flatbed sits entirely behind a truck cabin and includes a plurality of cabinets thereon;
   b) a hydraulic arm assembly operatively coupled towards a rear portion of said flatbed, said hydraulic arm assembly being fastened to a support mount disposed on a rear most end of said flatbed, wherein said hydraulic arm assembly further includes a seat and controls as part of said hydraulic arm assembly, wherein said hydraulic arm assembly further includes a first portion, a second portion, and a head, all being hinged and in hydraulic communication with each other;
   c) a crane assembly including a crane mount, a crane arm, and a hook; and
   d) a lift assembly including a first support frame with a first hydraulic and a second support frame with a second hydraulic, wherein said second support frame supports a platform that is translated along a top surface of a base and then translated downwardly to be abutting with a ground surface.

2. The utility truck body system with an integrated multifunctional arm and a lift assembly for a service vehicle of claim 1, wherein said plurality of cabinets have an L-shaped configuration and is abutting with a rear end of said truck cabin.

3. The utility truck body system with an integrated multifunctional arm and a lift assembly for a service vehicle of claim 1 wherein said support mount is an elongated metal rectangular structure that is horizontally positioned.

4. The utility truck body system with an integrated multifunctional arm and a lift assembly for a service vehicle of claim 1 wherein said seat and controls are disposed entirely as part of said hydraulic arm assembly.

5. The utility truck body system with an integrated multifunctional arm and a lift assembly for a service vehicle of claim 1 wherein said hinged head receives a plurality of attachments.

6. The utility truck body system with an integrated multifunctional arm and a lift assembly for a service vehicle of claim 1 wherein said hydraulic arm assembly further includes a retractable support.

7. The utility truck body system with an integrated multifunctional arm and a lift assembly for a service vehicle of claim 6 wherein said retractable support is positioned entirely below a bottom surface of said flatbed.

8. The utility truck body system with an integrated multifunctional arm and a lift assembly for a service vehicle of claim 1 wherein said crane mount is a structural base mount located at a first end of said crane arm.

9. The utility truck body system with an integrated multifunctional arm and a lift assembly for a service vehicle of claim 1 wherein said crane arm has a metal wired hook located at a second end of said crane arm.

10. The utility truck body system with an integrated multifunctional arm and a lift assembly for a service vehicle of claim 1 wherein said first support frame is a U-shaped frame that is abutting with the top surface of said flatbed, said first hydraulic located entirely above said first support frame.

11. The utility truck body system with an integrated multifunctional arm and a lift assembly for a service vehicle of claim 1 wherein said second support frame is a rectangular frame that is positioned vertically with respect to the first support frame, said second hydraulic being entirely embedded within the second support frame.

12. The utility truck body system with an integrated multifunctional arm and a lift assembly for a service vehicle of claim 1 wherein said platform is a rectangular platform and includes a ramp extending across an entire length of a peripheral edge of the platform.

13. The utility truck body system with an integrated multifunctional arm and a lift assembly for a service vehicle of claim 1 wherein said platform includes a mini skid steer.

14. A hydraulic system for a service vehicle, comprising:
a) a truck assembly including a flatbed having a hydraulic pump system with a plurality of interchangeable implements operatively coupled to a truck;
b) a hydraulic arm assembly operatively coupled towards a rear portion of said flatbed, said hydraulic arm assembly being fastened to a support mount disposed on a rear most end of said flatbed, wherein said hydraulic arm assembly further includes a seat and controls, wherein said hydraulic arm assembly further includes a first portion, a second portion, and a head, all hinged and in hydraulic communication with each other;
c) a crane assembly including a crane mount, a crane arm, and a hook; and
d) a lift assembly including a first support frame with a first hydraulic and a second support frame with a second hydraulic, wherein said first support frame is a U-shaped frame that is abutting with the top surface of said flatbed, said first hydraulic located entirely above said first support frame, wherein said second support frame is a rectangular frame that is positioned vertically with respect to the first support frame, said second hydraulic being entirely embedded within the second support frame, wherein said platform is a rectangular platform and includes a ramp extending across an entire length of a peripheral edge of the platform, wherein said platform includes a mini skid steer, wherein said mini skid steer includes a first position, wherein said first hydraulic and said second hydraulic are stationary in said first position, wherein said mini skid steer includes a second position wherein said first hydraulic is engaged resulting in said second support frame with said platform being translated across the top surface of a base, said second hydraulic being stationary in said second position, wherein said lift assembly further includes a third position, wherein said first hydraulic remains engaged in said third position, wherein said second hydraulic is engaged in said third position to translated said platform downwardly to be abutting with a ground surface thereby providing access for the mini skid steer vehicle to dismount from said platform.

15. A hydraulic system for a service vehicle, consisting of:
a) a truck assembly including a flatbed and a truck cabin having an engine, wherein said flatbed includes a hydraulic system with a plurality of interchangeable implements operatively coupled to said flatbed, wherein said flatbed further includes a plurality of cabinets, wherein said plurality of cabinets are formed into an L-shaped configuration and are abutting with a rear said of said truck cabin;
b) a hydraulic arm assembly operatively coupled towards a rear portion of said flatbed, said hydraulic arm assembly being fastened to a support mount disposed on a rear most end of said flatbed, wherein said hydraulic arm assembly further includes a seat and controls, wherein said hydraulic arm assembly further includes a first portion, a second portion, and a head, all being hinged and in hydraulic communication with each other;
c) a crane assembly including a crane mount, a crane arm, and a hook; and
d) a lift assembly including a first support frame with a first hydraulic and a second support frame with a second hydraulic, wherein said first support frame is a U-shaped frame that is abutting with the top surface of said flatbed, said first hydraulic located entirely above said first support frame, wherein said second support frame is a rectangular frame that is positioned vertically with respect to the first support frame, said second hydraulic being entirely embedded within the second support frame, wherein said platform is a rectangular platform and includes a ramp extending across an entire length of a peripheral edge of the platform, wherein said platform includes a mini skid steer, wherein said lift assembly includes a first position, wherein said first hydraulic and said second hydraulic are stationary in said first position, wherein said lift assembly includes a second position wherein said first hydraulic is engaged resulting in said second support frame with said platform being translated across the top surface of said flatbed, said second hydraulic being stationary in said second position, wherein said lift assembly further includes a third position, wherein said first hydraulic remains engaged in said third position, wherein said second hydraulic is engaged in said third position to translate said platform downwardly to be abutting with a ground surface thereby providing access for the mini skid steer to dismount from said platform.

* * * * *